United States Patent Office 2,863,846
Patented Dec. 9, 1958

2,863,846

ORGANO SILYL-SILICA FILLED SILOXANE ELASTOMERS AND PROCESS FOR PRODUCING SAME

Leslie J. Tyler, Midland, Mich., assignor to Dow Corning Corporation, Midland, Mich., a corporation of Michigan No Drawing. Application May 4, 1950
Serial No. 160,100

11 Claims. (Cl. 260—37)

This invention relates to siloxane elastomers.

Most siloxane rubbers heretofore known are materials having efficiencies of the order of 50 to 75. The efficiency of a rubber is the product of its tensile strength in p. s. i. times the percent elongation at break divided by 1,000. An exception is the elastomers disclosed in the copending application of Earl L. Warrick, Serial No. 86,110, filed April 7, 1949, now Patent 2,541,137, and assigned to the assignee of this invention.

These rubbers have efficiencies upwards of 150 and are prepared from special siloxane polymers and silica fillers. The reinforcing fillers employed therein have a heat of wetting by water of from 0.3 to 1 calorie per cc. of pore volume.

This invention relates to high efficiency siloxane elastomers (i. e. efficiencies upwards of 150) in which the special silica fillers have a heat of wetting by water of less than 0.2 calorie per cc. of pore volume.

It is an object of this invention to produce siloxane elastomers which have efficiencies upwards of 150. Another object is to provide high efficiency siloxane elastomers with improved crepe aging properties. Another object is to provide high efficiency siloxane elastomers with higher durometer values than heretofore obtained with such elastomers. Other objects and advantages will be apparent from the following description.

This invention relates to compositions of matter composed of a benzene soluble organopolysiloxane having a viscosity of at least 10,000 cs. and from 10 to 100 parts by weight based on the weight of 100 parts siloxane, of a silica filler having a pore volume of at least 3 cc. per gram. The filler is composed of organosilyl units of the formula RR'Si= or $R_2$R'Si— and $SiO_2$ in the molar ratio of from .06 to .6. The organo silyl units are linked to the silicon of the $SiO_2$ through SiOSi linkages.

The elastomers of this invention are prepared by curing a mixture of siloxane and filler at a temperature between 100° C. and 400° C. until a non-tacky rubbery product is obtained. One such method is that of heating the mixture at 250° C. for 24 hours. The resulting elastomers normally have efficiencies in excess of 150. The curing time can be greatly reduced by employing organic peroxides as vulcanization catalysts. When peroxides are employed, the curing is effected by heating at a temperature above 110° C. for a few minutes. The non-tacky product thus obtained may be aged at 200° C. to 250° C. to further improve its physical properties.

Peroxides which are employed as vulcanization catalysts are organic peroxides, such as benzoyl peroxide, tertiary butyl perbenzoate and tertiary butyl peracetate. The latter is described in the copending application of Earl L. Warrick, Serial No. 126,681, filed November 10, 1949, now Patent 2,572,227, which is assigned to the assignee of this invention. If peroxides are employed, it is preferable that they be used in amount less than 6 parts by weight per 100 parts of siloxane.

The elastomers of this invention are prepared from polymers which are benzene soluble and which have a viscosity of at least 10,000 cs. Such polymers range in physical state from relatively fluid liquids to non-flowing soft solids. The polymers may be prepared by any of the well known methods for polymerizing siloxanes. The desired physical properties are not obtained with polymers having viscosities below 10,000 cs. or with benzene insoluble gums.

The organosiloxanes employed in this invention are those in which the organic groups are methyl, ethyl, phenyl, trifluoromethylphenyl [$F_3CC_6H_4$—] or siliconeopentyl [$(CH_3)_3SiCH_2$—] radicals. Examples of such siloxanes are dimethylsiloxane, diethylsiloxane, phenylmethylsiloxane, phenylethylsiloxane, ethylmethylsiloxane, siliconeopentylmethylsiloxane, siliconeopentylethylsiloxane, trifluoromethylphenylmethylsiloxane, trifluoromethylphenylethylsiloxane or copolymers thereof. In addition, the polymers may contain limited amounts of diphenylsiloxane units, bis-siliconeopnetylsiloxane units, bis-trifluoromethylphenylsiloxane units and siloxane units of the type $RSiO_{3/2}$ and $R_3SiO_{1/2}$ where R is any of the above organic radicals. In all the polymers, at least 50 percent of the organic radicals are the defined alkyl radicals and there are from 1.98 to 2 organic radicals per silicon atom.

Trifluoromethylphenylsiloxanes may be prepared by reacting $F_3CC_6H_4Br$ with magnesium and thereafter coupling the resulting Grignard reagent with silicon tetrachloride, methyltrichlorosilane of ethyltrichlorosilane. The silanes are then hydrolyzed in the usual manner to the siloxane. Fluoromethylphenylsilanes are fully described and claimed in the copending application of Charles F. Kohl, Serial Number 130,857, filed December 2, 1949, now abandoned; and in U. S. Patents 2,640,066 and 2,640,063.

The fillers employed herein are finely divided powders having a pore volume of at least 3 ccs. per gram. They are composed of $SiO_2$ linked to organo silyl units of the formulae $R_2R'Si$— and RR'Si= through SiOSi linkages. R is an alkyl radical of less than 5 carbon atoms and R' is an alkyl radical of less than 5 carbon atoms or phenyl.

In order to produce high efficiency siloxane elastomers the filler must have a pore volume of at least 3 cc. per gram and the molar ratio of organo silyl groups to $SiO_2$ must be at least .06. The preferred molar range is from .08 to .25.

The pore volume is the value determined by placing a weighed sample of the filler in a pycnometer, filling the pycnometer with octamethylcyclotetrasiloxane and determining the ccs. of tetramer present by difference in weight. The pycnometer is recharged with a weighed sample of the silica and filled with mercury. The volume of mercury is determined. The volume of octamethylcyclotetrasiloxane is ccs. minus the volume of mercury in ccs. gives the pore volume in ccs. This is converted into ccs. per gram based upon the weight of the sample.

Methods of preparing the finely divided silicas are fully described in the applicant's copending application Serial Number 160,099, now abandoned, filed concurrently herewith. The preferred method of preparation is that of reacting silanes of the formulae $R_2R'SiX$ and $RR'SiX_2$ where X is chlorine or alkoxy with a silica organogel having a density of from .02 to .35 gram of $SiO_2$ per cc. of gel. The solvent and excess silane are then removed by evaporation at a temperature below the critical temperature of the solvent. The resulting product is a hydrophobic powder having a pore volume above 3 ccs. per gram.

As is well known, silica organogels are prepared by replacing water in a silica hydrogel with an organic solvent. The solvent employed to make the silicas of this invention are those which are inert to the above defined silanes.

Such solvents include ethers, hydrocarbons, chlorinated hydrocarbons, ketones and liquid completely condensed siloxanes.

The filler is employed in amount from 10 to 100 parts by weight filler based upon 100 parts by weight polymer. In amounts below 10 parts by weight little reinforcing is obtained while loadings in excess of 100 parts produce dry crumbly materials which are difficult to fabricate.

The heat stability of the elastomers of this invention is as good as that of heretofore known silicone rubbers. In addition, they possess a combination of high tensile strength, percent elongation and durometer values heretofore unknown in siloxane elastomers.

One of the difficulties encountered with siloxane elastomers filled with the heretofore known reinforcing fillers, such as silica aerogels and fume silicas is that the compounded material would set at room temperature prior to vulcanization. Thus, the compounded material (i. e. the unvulcanized polymer containing fillers with or without peroxides) would become tough and elastic upon standing. As a result, after a week or two, the material could not be molded or extruded into the desired shape. This undesirable property interferes with the commercial handling of such materials. The disadvantage is completely overcome by employing the fillers of this invention.

Minor amounts of other additives which are normally employed in siloxane rubbers may be incorporated in the products of this invention. These include for example pigments to impart the desired color and materials to improve a specific property such as compression set. An example of the latter is zinc peroxide. However, these minor additives do not alter the essential characteristics of the elastomers nor is their utility dependent thereon.

The plasticity values given for the polymers employed below were determined in accordance with ASTM–D–926–47T with the exception that a 4.2 gram sample was employed instead of the 2 cc. sample called for in the standard test.

The following examples are illustrative only.

EXAMPLE 1

A benzene soluble copolymeric siloxane having a composition of 3.5 mol percent phenylmethylsiloxane and 96.5 mol percent dimethylsiloxane and having a plasticity of 80 mils was compounded with 45 parts of a silica filler having a pore volume of 4.58 ccs. per gram. The filler was composed of $(CH_3)_3Si-$ and $SiO_2$ in the molar ratio of 0.156. The compounded material was molded 5 minutes under 60 pounds steam and then heated 24 hours at 250° C. The resulting elastomer had an efficiency of 290.

EXAMPLE 2

The various silica fillers having the composition shown in Table I, where each is compounded with the siloxane of Example 1 in amount of 30 parts by weight filler per 100 parts polymer. 3 parts by weight tertiary butyl perbenzoate based upon the siloxane was incorporated and the compounded material was heated at 150° C. for 5 minutes. The properties of the resulting elastomers are shown below.

Table I

| Filler Composition | Pore volume in cc. per g. | Molar ratio Organosilyl groups to $SiO_2$ | Tensile in p. s. i. | Percent Elongation | Efficiency |
|---|---|---|---|---|---|
| $(CH_3)_2Si-SiO_2$ | 4.5 | .145 | 421 | 440 | 185 |
| $C_6H_5(CH_3)_2Si-SiO_2$ | 4.5 | .185 | 409 | 403 | 164 |
| $(CH_3)_3Si-SiO_2$ | 4.5 | .183 | 898 | 633 | 560 |
| $(CH_3)_2C_2H_5Si-SiO_2$ | above 3.5 | above .08 | 659 | 460 | 303 |
| $CH_3(C_6H_5)Si-SiO_2$ | above 3.5 | above .08 | 390 | 368 | 138 |

EXAMPLE 3

The critical nature of pore volume is shown by the following example. The copolymeric siloxane of Example 1 was compounded with 30 parts by weight of each of the fillers shown in the Table II and in each case with 3 parts by weight tertiary butyl perbenzoate. The compounded polymer was cured by heating 5 minutes at 150° C. The resulting elastomers had the properties shown below:

Table II

| Filler Composition | Pore volume in cc. per g. | Molar ratio Organosilyl groups to $SiO_2$ | Tensile in p. s. i. | Percent Elongation | Efficiency |
|---|---|---|---|---|---|
| $(CH_3)_3Si-SiO_2$ | 4.5 | .2 | 920 | 755 | 694 |
| $(CH_3)_3Si-SiO_2$ | 4.5 | .106 | 669 | 945 | 579 |
| $(CH_3)_3Si-SiO_2$ | 2.5 | .15 | 106 | 390 | 40 |

EXAMPLE 4

A dimethylpolysiloxane having a viscosity of 140,000 cs. at 25° C. was compounded with 45 parts by weight of a filler having a pore volume of 4.58 ccs. per gram and a composition of $(CH_3)_3Si-SiO_2$ in the molar ratio of .156 and with 3 parts by weight benzoyl peroxide based on the weight of the siloxane. The compounded mixture was heated in a mold 5 minutes at 140° C. and the resulting elastomer had a tensile strength of 754 p. s. i. and an elongation at break of 633. The efficiency was 487.

EXAMPLE 5

A non-flowing benzene soluble polysiloxane having a plasticity of 88 mils and a composition of 5 mol percent phenylmethylsiloxane and 95 mol percent dimethylsiloxane was compounded with 45 parts of the filler of Example 4 and with 2 percent by weight tertiary butyl perbenzoate. The compounded material was heated 5 minutes at 140° C. and thereafter cured 24 hours at 250° C. The resulting elastomer had a tensile strength of 832 p. s. i., percent elongation at break of 320 and an efficiency of 266.

EXAMPLE 6

A polymeric dimethylsiloxane having a plasticity of 113 mils was compounded with 30 parts by weight of the filler of Example 4 and with 3 parts by weight tertiary butyl perbenzoate. The compounded material was heated 5 minutes at 140° C. in a mold and the resulting elastomer had a tensile strength of 645 p. s. i., an elongation at break of 430 percent and an efficiency of 277.

EXAMPLE 7

A copolymeric siloxane having a plasticity of 80 mils and a composition of 3.5 mol percent phenylmethylsiloxane and 96.5 mol percent dimethylsiloxane was compounded with 81 parts by weight of the filler of Example 4, and 3 parts by weight tertiary butyl perbenzoate. The compounded material was heated 5 minutes at 140° C. and the resulting elastomer had a tensile strength of 561 p. s. i. and an elongation at break of 795 percent. The efficiency was 445.

EXAMPLE 8

Elastomeric products having high efficiencies are obtained when any of the siloxanes shown below are compounded with 45 parts by weight of the filler of Example 1 and with 3 parts by weight of either benzoyl peroxide or tertiary butyl peracetate and thereafter heated for 15 minutes at 140° C.

| Composition in mol percent: | Plasticity in mils |
|---|---|
| 10 $(C_2H_5)_2SiO$, 90 $(CH_3)_2SiO$ | 90 |
| 5 $C_6H_5(C_2H_5)SiO$, 95 $(CH_3)_2SiO$ | 100 |
| 2.5 $(C_6H_5)_2SiO$, 97.5 $(CH_3)_2SiO$ | 90 |
| 10 $[(CH_3)_3SiCH_2]CH_3SiO$, 90 $(CH_3)_2SiO$ | 85 |
| 40 $C_2H_5(CH_3)SiO$, 60 $(CH_3)_2SiO$ | 110 |

EXAMPLE 9

.02 mol of the cyclic tetramer of bis-trifluoromethylphenylsiloxane and 0.98 mol of the cyclic tetramer of dimethylsiloxane were copolymerized by heating with potassium isopropoxide in amount of one potassium atom per 5,000 silicon atoms at 150° C. to 160° C. for 20 minutes. The copolymer was cooled to room temperature and 4 percent by weight of fuming sulfuric acid was added. After 5 to 10 minutes at room temperature the viscosity had increased. 2 percent by weight water was added and the viscosity continued to increase at room temperature until a solid benzene soluble polymer was obtained.

This polymer was milled with 40 parts by weight of the silica filler of Example 4 and with 4 parts by weight tertiary butyl perbenzoate and thereafter heated 10 minutes at 150° C. in a mold. The resulting elastomer had a tensile strength of 910 p. s. i., an elongation at break of 850 percent and an efficiency of 772.

That which is claimed is:

1. A method of preparing a siloxane elastomer which comprises heating a mixture of a benzene soluble organopolysiloxane having a viscosity of at least 10,000 cs. at 25° C., in which siloxane the organic radicals are selected from the group consisting of methyl, ethyl, phenyl, trifluoromethylphenyl and siliconeopentyl radicals, at least 50 percent of said radicals being alkyl and there being from 1.98 to 2 said organic radicals per silicon atom, and from 10 to 100 parts by weight of a filler based upon 100 parts by weight siloxane, said filler having a pore volume of at least 3 ccs. per gram and being composed of $SiO_2$ and organosilyl units selected from the group consisting of RR'Si= and $R_2R'Si$—, where R is an alkyl radical of less than 5 carbon atoms and R' is selected from the group consisting of alkyl radicals of less than 5 carbon atoms and phenyl radicals, in amount such that the molar ratio of said organosilyl units to $SiO_2$ is from .06 to .6, said organosilyl units being attached to the silicon atoms of the $SiO_2$ through SiOSi linkages, at a temperature from 100° C. to 400° C. until a coherent non-tacky rubbery product is obtained.

2. A method of preparing a siloxane elastomer which comprises heating a mixture of a benzene soluble organopolysiloxane having a viscosity of at least 10,000 cs. at 25° C., in which siloxane the organic radicals are selected from the group consisting of methyl, ethyl, phenyl, trifluoromethylphenyl and siliconeopentyl radicals, at least 50 percent of said radicals being alkyl and there being from 1.98 to 2 of said organic radicals per silicon atom, from 10 to 100 parts by weight of a filler based upon 100 parts by weight siloxane, said filler having a pore volume of at least 3 ccs. per gram and being composed of $SiO_2$ and organosilyl units selected from the group consisting of RR'Si= and $R_2R'Si$, where R is an alkyl radical of less than 5 carbon atoms and R' is selected from the group consisting of alkyl radicals of less than 5 carbon atoms and phenyl radicals, in amount such that the molar ratio of said organosilyl units to $SiO_2$ is from .06 to .6, said organosilyl units being attached to the silicon atoms of the $SiO_2$ through SiOSi linkages and an organic peroxide selected from the group consisting of benzoyl peroxide, tertiary butyl perbenzoate and tertiary butyl peracetate, in amount less than 6 parts by weight based upon the weight of the siloxane, at a temperature between 110° C. and 400° C. until a non-tacky coherent rubbery product is obtained.

3. A heat curable composition of matter composed of a benzene soluble organopolysiloxane having a viscosity of at least 10,000 cs. at 25° C. in which siloxane the organic radicals are selected from the group consisting of methyl, ethyl, phenyl, trifluoromethylphenyl and siliconeopentyl radicals, at least 50 percent of said radicals being alkyl and there being from 1.98 to 2 of said organic radicals per silicon atom and from 10 to 100 parts by weight of a filler based upon 100 parts by weight siloxane, said filler having a pore volume of at least 3 ccs. per gram and being composed of $SiO_2$ and organosilyl units selected from the group consisting of RR'Si= and $R_2R'Si$ where R is an alkyl radical of less than 5 carbon atoms and R' is selected from the group consisting of alkyl radicals of less than 5 carbon atoms and phenyl radicals, in amount such that the molar ratio of said organosilyl units to $SiO_2$ is from .06 to .6, said organosilyl units being attached to the silicon atoms of the $SiO_2$ through SiOSi linkages.

4. A composition of matter in accordance with claim 3 in which the organopolysiloxane is dimethylpolysiloxane.

5. A heat curable composition of matter composed of a benzene soluble organopolysiloxane having a viscosity of at least 10,000 cs. at 25° C., in which siloxane the organic radicals are selected from the group consisting of methyl, ethyl, phenyl, trifluoromethylphenyl and siliconeopentyl radicals, at least 50 percent of said radicals being alkyl and there being from 1.98 to 2 of said organic radicals per silicon atom, and from 10 to 100 parts by weight of a filler based upon 100 parts by weight siloxane, said filler having a pore volume of at least 3 ccs. per gram and being composed of $SiO_2$ and organosilyl units selected from the group consisting of RR'Si= and $R_2R'Si$— in which R is an alkyl radical of less than 5 carbon atoms and R' is selected from the group consisting of alkyl radicals of less than 5 carbon atoms and phenyl radicals, in amount such that the molar ratio of said organosilyl units to $SiO_2$ is from .06 to .6, said organosilyl units being attached to the silicon atoms of the $SiO_2$ through SiOSi linkages and an organic peroxide selected from the group consisting of benzoyl peroxide, tertiary butyl perbenzoate and tertiary butyl peracetate in amount less than 6 parts by weight based upon the weight of the siloxane.

6. A composition of matter in accordance with claim 5 in which the organopolysiloxane is a methylphenylsiloxane in which at least 50 percent of the radicals are methyl and in which the filler is composed of trimethylsilyl units and $SiO_2$ in amount such that the molar ratio of said organosilyl units to $SiO_2$ is from .08 to .25.

7. A composition of matter in accordance with claim 5 in which the organopolysiloxane is dimethylpolysiloxane.

8. A siloxane elastomer composed of a benzene soluble organopolysiloxane having a viscosity of at least 10,000 cs. at 25° C., in which siloxane the organic radicals are selected from the group consisting of methyl, ethyl, phenyl, trifluoromethylphenyl and siliconeopentyl radicals, at least 50 percent of said radicals being alkyl and there being from 1.98 to 2 of said organic radicals per silicon atom and from 10 to 100 parts by weight of a filler based upon 100 parts by weight siloxane, said filler having a pore volume of at least 3 ccs. per gram and being composed of $SiO_2$ and organosilyl units selected from the group consisting of RR'Si= and $R_2R'Si$— in which R is an alkyl radical of less than 5 carbon atoms and R' is selected from the group consisting of alkyl radicals of less than 5 carbon atoms and phenyl radicals in amount such that the molar ratio of said organosilyl units to $SiO_2$ is from .06 to .6 said organosilyl units being attached to the silicon atoms of the $SiO_2$ through SiOSi linkages.

9. A siloxane elastomer in accordance with claim 8 in which the organopolysiloxane is a methylphenylsiloxane in which at least 50 percent of the radicals are methyl and in which the filler is composed of trimethylsilyl units and $SiO_2$ in amount such that the molar ratio of trimethylsilyl units to $SiO_2$ is from .08 to .25.

10. A siloxane elastomer in accordance with claim 8 in which the organopolysiloxane is dimethylpolysiloxane.

11. A heat curable composition of matter composed of a benzene soluble methylphenylpolysiloxane having a viscosity of at least 10,000 cs. at 25° C. in which siloxane there is from 1.98 to 2 methyl and phenyl radicals per silicon atom, at least 50 percent of said radicals being methyl and from 10 to 100 parts by weight of a filler based upon 100 parts by weight siloxane, said filler having a pore volume of at least 3 ccs. per gram and being composed of trimethylsilyl units and $SiO_2$ in amount such that the molar ratio of trimethylsilyl units to $SiO_2$ is from .08 to .25, said silyl units being attached to the silicon atoms of the $SiO_2$ through SiOSi linkages.

References Cited in the file of this patent

UNITED STATES PATENTS

| | | |
|---|---|---|
| 2,441,422 | Krieble et al. | May 11, 1948 |
| 2,452,416 | Wright | Oct. 26, 1948 |
| 2,460,795 | Warrick | Feb. 1, 1949 |
| 2,541,137 | Warrick | Feb. 13, 1951 |
| 2,563,555 | Safford | Aug. 7, 1951 |
| 2,567,316 | Bidaud | Sept. 11, 1951 |
| 2,608,545 | Warrick | Aug. 26, 1952 |
| 2,610,167 | Te Grotenhuis | Sept. 9, 1952 |